United States Patent [19]

Shaw et al.

[11] Patent Number: 4,530,603
[45] Date of Patent: Jul. 23, 1985

[54] STABILIZED FIBER OPTIC SENSOR

[75] Inventors: Herbert J. Shaw; Marvin Chodorow, both of Stanford; Loren F. Stokes, Palo Alto, all of Calif.

[73] Assignee: The Board of Trustees of Leland Stanford Jr. Univ., Stanford, Calif.

[21] Appl. No.: 426,887

[22] Filed: Sep. 29, 1982

[51] Int. Cl.$^3$ .............................................. G01B 9/02
[52] U.S. Cl. .................................... 356/345; 73/657; 250/227; 350/96.15; 356/346; 356/352
[58] Field of Search .............. 356/345, 346, 350, 352; 250/227; 73/800, 655, 657; 350/96.15, 96.20, 96.21

[56] References Cited

U.S. PATENT DOCUMENTS

| | | | |
|---|---|---|---|
| 4,002,997 | 1/1977 | Thompson | 331/94.15 |
| 4,136,929 | 1/1979 | Suzaki | 350/96.15 |
| 4,325,636 | 4/1982 | Schiffner | 356/350 |
| 4,342,499 | 8/1982 | Hicks, Jr. | 350/96.15 |
| 4,354,760 | 10/1982 | Schiffner | 356/350 |
| 4,451,151 | 5/1984 | Huignard | 356/345 |
| 4,469,397 | 9/1984 | Shaw et al. | 350/96.15 |
| 4,473,270 | 9/1984 | Shaw | 350/96.15 |

FOREIGN PATENT DOCUMENTS 1156489 11/1983 Canada .
8001892 1/1980 France .

OTHER PUBLICATIONS

Ezekiel, S.; Cole, J. A.; Harrison, J.; and Sanders, G.; "Passive Cavity Optical Rotation Sensor", *SPIE*, vol. 157, *Laser Inertial Rotation Sensors*, 1978, pp. 68–72.
Jackson, D. A.; Dandridge, A.; and Sheem, S. K., "Measurement of Small Phase Shifts Using a Single-Mode Optical-Fiber Interferometer", *Optics Letters*, vol. 5, No. 4, Apr., 1980, pp. 139–141.
Hill, K. O.; Kawasaki, B. S.; and Johnson, D. C., "cw Brillouin Laser", Applied Physics Letters, vol. 28, No. 10, May 15, 1976, pp. 608–609.
Bergh, et al., "Single-Mode Fibre Optic Directional Coupler", *Electronics Letters*, vol. 16, No. 7, Mar. 27, 1980.
Stokes et al., "All-Single-Mode Fiber Resonator", *Optics Letters*, vol. 7, No. 6, Jun. 1982.
Cielo, "Fiber Optic Hydrophone: Improved Strain Configuration and Environmental Noise Protection", *Applied Optics*, vol. 18, No. 17, pp. 2933–2937, 9/79.
Fritsh et al., "Simple Circuit for Feedback Stabilization of a Single-Mode Optical Fiber Interferometer", *Rev. Sci. Instru.*, vol. 52, No. 7, pp. 996–1000, 7/81.
Ponikvar, Donald R. and Ezekiel, Shaoul, "Stabilized Single-Frequency Stimulated Brillouin Fiber Ring Laser", Optics Letters, vol. 6, No. 8, Aug., 1981, pp. 398–400.
Jackson, D. A.; Priest, R.; Dandridge, A.; and Tveten, A. B., "Elimination of Drift in a Single-Mode Optical Fiber Interferometer Using a Piezoelectrically Stretched Coiled Fiber", *Applied Optics*, vol. 19, No. 17, Sep. 1, 1980, pp. 2926–2929.
Sanders, G. A.; Prentiss, M. G.; and Ezekiel, S., "Passive Ring Resonator Method for Sensitive Inertial Rotation Measurements in Geophysics and Relativity", *Optics Letters*, vol. 6, No. 11, Nov., 1981, pp. 569ƒ571.
Petuchowski, S. J.; Giallorenzi, T. G.; and Sheem, S. K., "A Sensitive Fiber Optic Fabry-Perot Interferometer", *IEEE Journal of Quantum Electronics*, vol. QE-17, No. 11, Nov., 1981, pp. 2168–2170.

Primary Examiner—Davis L. Willis
Assistant Examiner—Matthew W. Koren
Attorney, Agent, or Firm—Knobbe, Martens, Olson & Bear

[57] ABSTRACT

A fiber optic sensor comprises a length of optical fiber, forming a loop, and a fiber optic directional coupler for optically closing the loop. The loop and coupler form a resonant cavity for light circulating therethrough. A PZT cylinder, about which the fiber loop is wrapped, is utilized to control the total round trip phase delay of the circulating light, and thus, control the intensity of the optical output signal. The phase delay is adjusted to a point where the optical output signal is at maximum sensitivity to changes in phase. When the fiber loop is exposed to, e.g., acoustic waves, the loop length changes correspondingly, thereby causing the phase delay, and thus, the optical output signal to vary. By detecting variations in output signal intensity, the frequency and intensity of the acoustic waves may be determined. The sensor also includes a feedback system for stabilizing the fiber loop against low frequency thermal drift.

21 Claims, 14 Drawing Figures

STABILIZED FIBER OPTIC SENSOR

BACKGROUND OF THE INVENTION

The present invention relates to fiber optic sensors, and particularly to a stabilized, all fiber, resonant ring interferometric sensor.

Optical fibers are sensitive to a large number of ambient effects, such as acoustic waves and temperature fluctuations. The ambient quantities acting upon the optical fiber can result in changes in the amplitude, phase, or polarization of light propagating therethrough. Consequently, there has recently been a great deal of interest in the use of fibers as sensor elements.

Mach-Zehnder and Sagnac interferometers are commonly used as sensors. In these interferometers, the phase difference between interfering light waves varies in response to the variations in sensed quantity, and thus, by detecting the intensity of light produced by such interfering waves, the magnitude of the sensed quantity can be determined. In addition, the detected intensity varies as a function of the cosine of the phase difference between the light waves. Typically, the interferometer is biased to operate at the point of maximum slope on such cosine curve, the sensed quantity being detected by measuring fluctuations in intensity from this operating point. However, the maximum slope of a cosine curve is about $\frac{1}{2}$ radians$^{-1}$, assuming a peak-to-peak optical power normalized between zero and one. Thus, the sensitivity of these devices is limited. Further, since a cosine curve becomes very non-linear towards its minima and maxima, only a portion of the curve is generally usable for linear measurements.

SUMMARY OF THE INVENTION

The sensor of the present invention alleviates these and other problems of the prior art by utilizing a high finesse, all fiber optic ring resonator. The output power curve of such resonator is in the form of an extremely sharp spike, and is quite linear. Further, the maximum slope of such output curve, assuming a resonator finesse of about 80, is on the order of 14 radians $^{-1}$. This particular resonator, therefore, provides a highly accurate fiber optic sensor, for measuring environmental quantities which affect light propagating therethrough.

In the embodiment shown, the resonator functions as an acoustic sensor. Audio waves incident on the loop cause the length of such loop to vary as a function of the audio wave magnitude and frequency. This variation in loop length, in turn, causes the output power of the resonator to vary correspondingly. By detecting this variation in output power, a direct indication of the magnitude and frequency of the audio waves may be obtained.

Loop length variations may also be caused by other ambient, environmental effects, such as temperature fluctuations, which cause the resonator output power to drift at a relatively low frequency. The present invention provides compensation for such low frequency drift through a feedback system.

The measured sensitivity to periodic phase shifts, induced by loop length changes in the fiber ring, is $1.0 \times 10^{-6}$ rad/$\sqrt{Hz}$ or better over the 100 Hz to 10 KHz frequency range, with a sensitivity of $1.9 \times 10^{-7}$ rad/$\sqrt{Hz}$ 10 KHz. In the region above 100 Hz, the sensitivity is generally at least twice that of a comparable Mach-Zehnder interferometer. Tests indicate that this sensitivity is not limited by shot-noise, but rather by the spectral bandwidth of the single frequency laser source. Thus, as the spectral purity of single frequency lasers is improved, the above sensitivity should increase concomitantly.

BRIEF DESCRIPTION OF THE DRAWINGS

These and other aspects of the present invention may be further understood through reference to the drawings in which.

DETAILED DESCRIPTION OF THE PREFERRED EMBODIMENT

Figure 1:
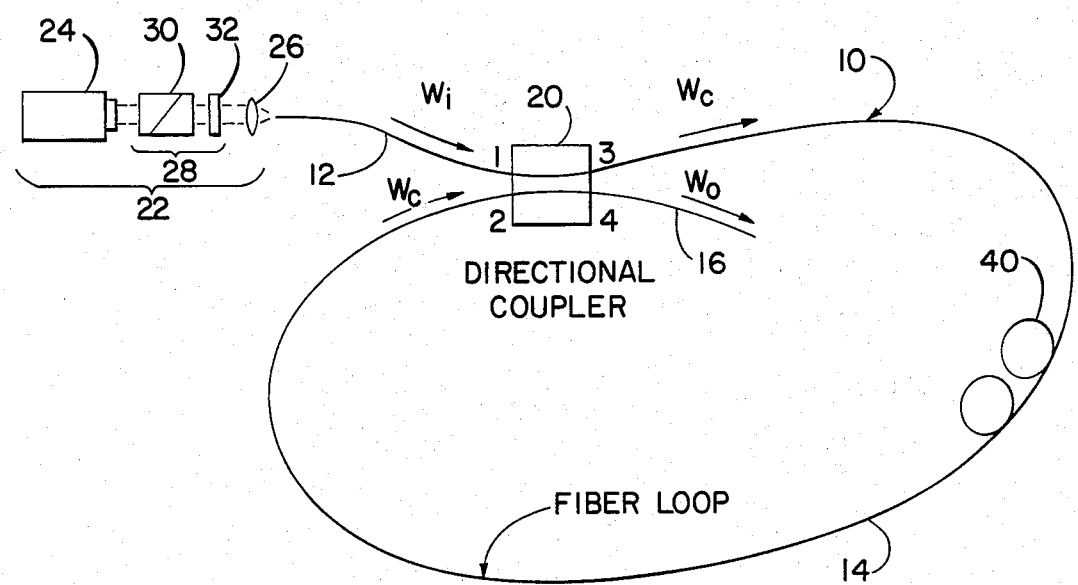
FIG. 1 is a schematic drawing of the resonator utilized in the fiber optic sensor of the present invention, showing a light source for introducing light into the fiber loop, and a fiber optic directional coupler for closing the fiber loop.

The fiber optic sensor of the present invention utilizes a fiber optic resonator, described and claimed in co-pending patent application Ser. No. 426890, entitled "Fiber Optic Resonator", filed Sept. 29, 1982, now U.S. U.S. Pat. No. 4,469,397, by the inventors of the present invention, and assigned to the assignee of the present invention. As shown in FIG. 1, this resonator comprises a continuous, uninterrupted strand 10 of single mode optical fiber, having an input end portion 12, a loop portion 14, and an output end portion 16. At the ends of the loop portion 14, the fiber 10 is optically coupled together by means of a fiber optic, evanescent field, four port, directional coupler 20, having ports 1 and 2 on one side thereof, and ports 3 and 4 on the other side thereof. Tracing the fiber 10 from one end to the other, the fiber 10 first passes through ports 1 and 3, and then through ports 2 and 4, so that the loop 14 extends from ports 3 and 2, while the input portion 12 extends from port 1, and the output portion 16 extends from port 4.

A laser source 22 is provided to introduce light into the input fiber portion 12, for circulation through the loop portion 14. The source 22 comprises a single frequency, continuous wave, long coherence length laser 24, such as a Tropel model 200 HeNe gas laser. This laser produces single frequency light at a wavelength of 632.8 nm and has a coherence length of well over a kilometer.

A lens 26 may be used to focus light from the laser 24 for introduction into the fiber portion 12. In addition, an optical isolator 28, comprising a polarizer 30 and a quarterwave plate 32 may be interposed between the laser 24 and lens 26 to prevent light reflected from the lens 26 and input fiber portion 12 from entering the laser 24, and interfering with its operation.

In the resonator embodiment shown, the fiber 10 comprises an ITT single mode fiber having a core diameter of 4 microns, an effective core area of $1.6 \times 10^{-7} cm^2$, an effective refractive index of 1.46, and an attenuation of 8.3db/km. The loop 14 includes a polarization controller 40 to provide compensation for fiber birefringence in the loop 14, so that circulating light at port 2 of the coupler 20 has substantially the same polarization as light from the laser source 22 at the port 1.

Both the polarization controller 40 and the coupler 20 are fiber optic, as distinguished from bulk optic components.

THE COUPLER 20

A preferred fiber optic directional coupler for use as the coupler 20 in the resonator is described in copending patent application Ser. No. 300,955, filed 9/10/81, entitled FIBER OPTIC DIRECTIONAL COUPLER, which is a continuation-in-part of application Ser. No. 139,511, filed 4/11/80, entitled FIBER OPTIC DIRECTIONAL COUPLER, both of which are assigned to the assignee of the present invention. In addition, the coupler is described in the Mar. 29, 1980 issue of *Electronics Letters*, Vol. 16, No. 7, pages 260–261. These patent applications and publication are hereby incorporated by reference herein.

Figure 2:
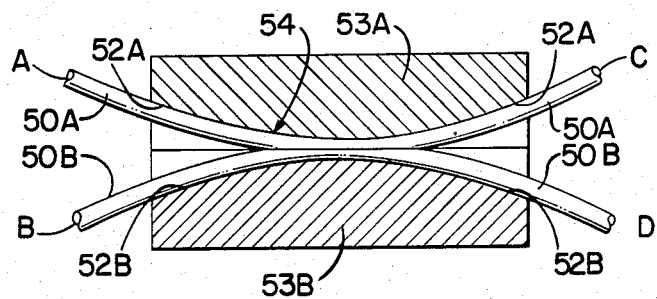
FIG. 2 is a sectional view of one embodiment of a fiber optic directional coupler for use in the resonator of FIG. 1.

As illustrated in FIG. 2, the coupler includes two exemplary strands 50A and 50B of a single mode fiber optic material mounted in longitudinal arcuate grooves 52A and 52B, respectively, formed in optically flat, confronting surfaces of rectangular bases or blocks 53A and 53B, respectively. The block 53A with the strand 50A mounted in the groove 52A will be referred to as the coupler half 51A, and the block 53B with the strand 50B mounted in the groove 52B will be referred to as the coupler half 51B.

The arcuate grooves 52A and 52B have a radius of curvature which is very large compared to the diameter of the fibers 50, and have a width slightly larger than the fiber diameter to permit the fibers 50, when mounted therein, to conform to a path defined by the bottom walls of the grooves 52. The depth of the grooves 52A and 52B varies from a minimum at the center of the blocks 53A and 53B, respectively, to a maximum at the edges of the blocks 53A and 53B, respectively. This advantageously permits the fiber optic strands 50A and 50B, when mounted in the grooves 52A and 52B, respectively, to gradually converge toward the center and diverge toward the edges of the blocks 53A,53B, thereby eliminating any sharp bends or abrupt changes in direction of the fibers 50 which may cause power loss through mode perturbation. In the embodiment shown, the grooves 52 are rectangular in cross-section, however, it will be understood that other suitable cross-sectional contours which will accommodate the fibers 50 may be used alternatively, such as a U-shaped cross-section or a V-shaped cross-section.

At the centers of the blocks 53, in the embodiment shown, the depth of the grooves 52 which mount the strands 50 is less than the diameter of the strands 50, while at the edges of the blocks 53, the depth of the grooves 52 is preferably at least as great as the diameter of the strands 50. Fiber optic material was removed from each of the strands 50A and 50B, e.g., by lapping, to form respective oval-shaped planar surfaces, which are coplanar with the confronting surfaces of the blocks 53A,53B. These oval surfaces, where the fiber optic material has been removed, will be referred to herein as the fiber "facing surfaces". Thus, the amount of fiber optic material removed increases gradually from zero towards the edges of the blocks 53 to a maximum towards the center of the blocks 53. This tapered removal of the fiber optic material enables the fibers to converge and diverge gradually, which is advantageous for avoiding backward reflection and excess loss of light energy.

In the embodiment shown, the coupler halves 51A and 51B are identical, and are assembled by placing the confronting surfaces of the blocks 53A and 53B together, so that the facing surfaces of the strands 50A and 50B are juxtaposed in facing relationship.

An index matching substance (not shown), such as index matching oil, is provided between the confronting surfaces of the blocks 53. This substance has a refractive index approximately equal to the refractive index of the cladding, and also functions to prevent the optically flat surfaces from becoming permanently locked together. The oil is introduced between the blocks 53 by capillary action.

An interaction region 54 is formed at the junction of the strands 50, in which light is transferred between the strands by evanescent field coupling. It has been found that, to ensure proper evanescent field coupling, the amount of material removed from the fibers 50 must be carefully controlled so that the spacing between the core portions of the strands 50 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 50 is within the critical zone, each strand receives a significant portion of the evanescent field energy from the other strand, and good coupling is achieved without significant energy loss. The critical zone includes that area in which the evanescent fields of the fibers 50A and 50B overlap with sufficient strength to provide coupling, i.e., each core is within the evanescent field of the other. However, as previously indicated, mode perturbation occurs when the cores are brought too close together. For example, it is believed that, for weakly guided modes, such as the $HE_{11}$ mode in single mode fibers, such mode perturbation begins to occur when sufficient material is removed from the fibers 50 to expose their cores. Thus, the critical zone is defined as that area in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown, the required center-to-center spacing between the strands 50 at the center of the coupler is typically less than a few (e.g., 2-3) core diameters.

Preferably, the strands 50A and 50B (1) are identical to each other; (2) have the same radius of curvature at the interaction region 54; and (3) have an equal amount of fiber optic material removed therefrom to form their respective facing surfaces. Thus, the fibers 50 are symmetrical, through the interaction region 54, in the plane of their facing surfaces, so that their facing surfaces are coextensive if superimposed. This ensures that the two fibers 50A and 50B will have the same propagation characteristics at the interaction region 54, and thereby avoids coupling attenuation associated with dissimilar propagation characteristics.

The blocks or bases 53 may be fabricated of any suitable rigid material. In one presently preferred embodiment, the bases 53 comprise generally rectangular blocks of fused quartz glass approximately 1 inch long, 1 inch wide, and 0.4 inch thick. In this embodiment, the fiber optic strands 50 are secured in the slots 52 by suitable cement, such as epoxy glue. One advantage of the fused quartz blocks 53 is that they have a coefficient of thermal expansion similar to that of glass fibers, and this advantage is particularly important if the blocks 53 and fibers 50 are subjected to any heat treatment during the manufacturing process. Another suitable material for the block 53 is silicon, which also has excellent thermal properties for this application.

The coupler of FIG. 2 includes four ports, labeled A, B, C, and D, which correspond to the ports 1, 2, 3, and 4, respectively, of the coupler 20 in FIG. 1. When viewed from the perspective of FIG. 2, ports A and B, which correspond to strands 50A and 50B, respectively, are on the left-hand side of the coupler, while the ports C and D, which correspond to the strands 50A and 50B, respectively, are on the right-hand side of the coupler. For the purposes of discussion, it will be assumed that input light is applied to port A. This light passes through the coupler and is output at port C and/or port D, depending upon the amount of power that is coupled between the strands 50. In this regard, the term "coupling constant" is defined as the ratio of the coupled power to the total output power. In the above example, the coupling constant would be equal to the ratio of the power at port D of the sum of the power output at ports C and D. This ratio is also referred to as the "coupling efficiency", and when so used, is typically expressed as a percent. Thus, when the term "coupling constant" is used herein, it should be understood that the corresponding coupling efficiency is equal to the coupling constant times 100. For example, a coupling constant of 0.5 is equivalent to a coupling efficiency of 50%.

The coupler may be "tuned" to adjust the coupling constant to any desired value between zero and 1.0, by offsetting the facing surfaces of the blocks 53. Such tuning may be accomplished by sliding the blocks 53 laterally relative to each other.

The coupler is highly directional, with substantially all of the power applied at one side of the coupler being delivered to the other side of the coupler. That is, substantially all of the light applied to input port A is delivered to the ports C and D, without contra-directional coupling to port B. Likewise, substantially all of the light applied to port B is delivered to the ports C and D. Further, this directivity is symmetrical, so that substantially all of the light applied to either port C or input port D is delivered to the ports A and B. Moreover, the coupler is essentially non-discriminatory with respect to polarizations, and thus, preserves the polarization of the light. Thus, for example, if a light beam having a vertical polarization is input to port A, the light cross-coupled from port A to port D, as well as the light passing straight through from port A to port C, will remain vertically polarized.

Light that is cross-coupled from one of the fibers to the other undergoes a phase shift of $+\pi/2$, while light that is not cross-coupled is not shifted in phase during propagation through the coupler. Thus, for example, if light is input to port A, the cross-coupled light of port D will be advanced in phase by $\pi/2$, while the light passing straight through to port C remains unchanged in phase.

The coupler is also a low loss device, having insertion or throughput losses typically on the order of 2-3 percent. The term "insertion loss", as used herein, refers to the real scattering losses of light passing through the coupler, from one side to the other. For example, if light is applied to port A, and 97% of that light reaches ports C and D (combined), the insertion loss would be 0.03 (3%). The term "coupler transmission" is defined as one minus the insertion loss. Thus, if the insertion loss is 0.03 (3%), the coupler transmission is 0.97 (97%).

THE POLARIZATION CONTROLLER 40

One type of polarization controller suitable for use as the polarization controller 40 of FIG. 1 is described in copending patent application Ser. No. 183,975, filed 9/3/80, entitled FIBER OPTIC POLARIZATION CONTROLLER, now U.S. Pat. No. 4,389,090 assigned to the assignee of the present invention. In addition, such a polarization controller is described in the Sept.

25, 1980 issue of *Electronics Letters*, Vol. 16, No. 20, pages 778 to 780. This patent application and publication are hereby incorporated by reference herein.

Figure 3:
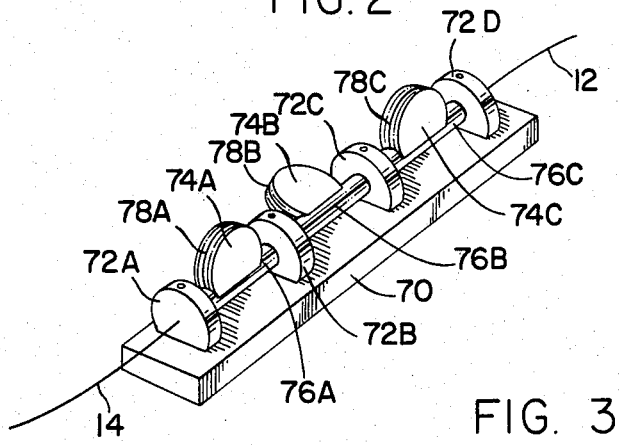
FIG. 3 is a perspective view of one embodiment of a fiber optic polarization controller for use in the resonator of FIG. 1.

As illustrated in FIG. 3, the controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76, with the axes of the spools 74 perpendicular to the axes of the shafts 76. The fiber portion 14 (FIG. 1) extends through axial bores in the shafts 76 and is wrapped about each of the spools 74 to form three coils 78A through 78C. The radii of the coils 78 are such that the fiber 14 is stressed to form a birefringent medium in each of the coils 78. The three coils 78A through 78C may be rotated independently of each other about the axes of the shafts 74A through 74C, respectively, to adjust the birefringence of the fiber 14 and, thus, control the polarization of the light passing through the fiber 14.

The diameter and number of turns in the coils 78 are such that the outer coils 78A and C provide a spatial delay of one-quarter wavelength, while the central coil 78B provides a spatial delay of one-half wavelength. The quarter wavelength coils 78A and C control the ellipticity of the polarization, and the half wavelength coil 78B controls the direction of polarization. This provides a full range of adjustment of the polarization of the light propagating through the fiber portion 14. It will be understood, however that the polarization controller may be modified to provide only the two quarterwave coils 78A and C, since the direction of polarization (otherwise provided by the central coil 78B) may be controlled indirectly through proper adjustment of the ellipticity of polarization by means of the two quarterwave coils 78A and C. Accordingly, the polarization controller 40 is shown in FIG. 1 as including only the two quaterwave coils 78A and C. Since this configuration reduces the overall size of the controller 40, it may be advantageous for certain applications of the present invention involving space limitations.

Thus, the polarization controller 40 provides means for establishing, maintaining, and controlling the polarization of ligh propagating through the fiber portion 14.

OPERATION OF THE RESONATOR

Referring again to FIG. 1, in operation, light introduced from the source 22 into the fiber portion 12 propagates to port 1 of the coupler 20, where a portion of the light is coupled to port 4, with the remaining portion propagating to port 3. The light at port 4 propagates through the fiber portion 16, and out of the end of the fiber 10. However, the light at port 3 traverses the loop portion 14 and again enters the coupler at port 2, where a portion is coupled to port 3 while the remaining portion propagates to port 4, and through the fiber portion 16. It will be seen that the loop 14 and coupler 20 cooperate to provide a resonant cavity so that light entering the coupler at port 2 interferes with incoming light from the laser source 22. Such interference is constructive at port 3, while being destructive at port 4, thereby causing light to build up in the resonant cavity loop.

Hereinafter, the light from the source 22, propagating through the fiber portion 12 to port 1, will be referred to as the input signal wave $W_i$, while light exiting port 4, for propagation through the fiber portion 16, will be referred to as the output signal wave $W_o$. The light circulating in the loop portion 14 will be referred to as the circulating wave $W_c$.

As the circulating wave $W_c$ propagates about the loop 14, from port 3 to port 2, a fractional amount of its power will be lost, due to fiber transmission losses. The term "fiber transmission losses" is defined as the fractional loss during propagation through the fiber, from port 3 to port 2. In the embodiment shown, the fiber transmission losses are purely a function of fiber attenuation, so that the power or intensity of the wave $W_c$ at port 2 is equal to the power of the wave $W_c$ at port 3 times the quantity exp $(-2\alpha_0 L)$, where L is the optical path length of the loop 14 for light circulating therethrough, excluding any phase shift of the coupler 20, and $\alpha_0$ is the amplitude attenuation coefficient of the fiber 10. It will be understood that, if an additional component (e.g., a fiber optic polarizer) is placed in the fiber loop, the losses attributable to this component are included within the definition of fiber transmission losses. In addition, the term "fiber transmission" is defined as the circulating wave power at port 2 divided by the circulating wave power at port 3. Stated another way, it is a fractional amount of power from port 3 that reaches port 2 (i.e., fiber transmission equals 1−fiber transmission losses).

In addition to being attenuated by fiber transmission losses, the circulating wave $W_c$ will be degraded slightly on each pass through the coupler 20, due to coupler insertion losses. Further, the power or intensity of the input wave $W_i$ will experience a loss, due to coupler insertion losses, during propagation through the coupler 20. In this regard, the coupler 20 may be molded as a lossless device with an added lumped insertion loss ($\gamma_0$) that is independent of the coupling constant. The relationship between the coupler insertion loss and the complex amplitudes at each of the four ports of the coupler 20 is:

$$|E_3|^2 + |E_4|^2 = (1-\gamma_0)(|E_1|^2 + |E_2|^2) \qquad (1)$$

where: $E_1$, $E_2$, $E_3$, and $E_4$ are the complex electric field amplitudes at the coupler ports 1, 2, 3, and 4; and $\gamma_0$ is the coupler insertion loss (typically on the order of 2% to 10%).

The complex amplitudes at ports 3 and 4, after the coupled-mode interaction, are related to the field amplitudes at ports 1 and 2 as follows:

$$E_3 = (1-\gamma_0)^{\frac{1}{2}}(1-K)^{\frac{1}{2}} E_1 + j\sqrt{K}\, E_2 \qquad (2)$$

and, $$E_4 = (1-\gamma_0)^{\frac{1}{2}} j\sqrt{K}\, E_1 + (1-K)^{\frac{1}{2}} E_2 \qquad (3)$$

where K is the intensity coupling constant. No coupling corresponds to K=0, whereas K=1 provides full coupling. $E_2$ and $E_3$ are further related in that:

$$E_2 = E_3 e^{-\alpha_0 L} e^{j\beta L} \qquad (4)$$

where:

$$\beta = n\omega/c \qquad (5)$$

and: $\alpha_0$ is the amplitude attenuation coefficient of the fiber; L is the length of the fiber loop portion 14; n is the effective refractive index of the fiber; $\omega$ is the optical frequency; $\beta$ is the propagation constant of the fiber 10; and c is the speed of light.

For full resonance, the output wave $W_o$ should be zero, and thus, the ratio $E_4/E_1$ should be zero. Accordingly, by solving Equations 2, 3, and 4, for $E_4/E_1$ in terms of $\gamma_0$, K, $\beta_0 L$, and $\beta L$, and setting $E_4/E_1$ equal to zero, the conditions for resonance, in terms of the loop length L and the coupling constant K, may be found. One of the conditions necessary for resonance is that:

$$\beta L = q2\pi - \pi/2 \qquad (6)$$

where q is any integer.

Thus, for full resonance, the total phase delay ($\beta L$) around the loop 14, excluding any phase shift due to the coupler 20, must equal an integral number of $2\pi$ radians, less $\pi/2$.

Note that, from Equations 2 and 3, the directional coupler 20 has a $+\pi/2$ phase shift. By adding this phase shift to $\beta L$ in Equation 6, it may be seen that the total accumulated phase of the circulating wave $W_c$, as it traverses the loop 14 (e.g., from an arbitrary point on the loop, around the loop, back to that arbitrary point) is equal to $q(2\pi)$. As will be understood from a subsequent discussion, the loop length may be adjusted to satisfy this resonant condition, after assembly of the reasonator, by mechanically stretching the fiber 14 using an electrically driven PZT cylinder, about which the fiber 14 is wrapped.

Figure 4:
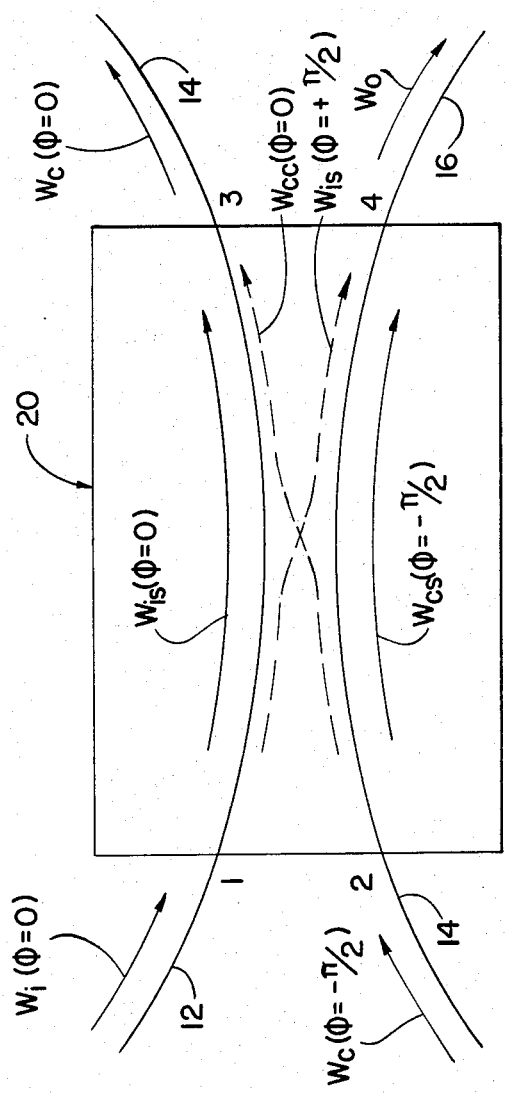
FIG. 4 is a schematic view of the fiber optic directional coupler shown in FIGS. 1 and 2, illustrating the phases of the lightwave components propagating therethrough.

The resonant condition, defined by Equation 6, may be more fully understood through reference to FIG. 4, which shows the manner in which the $\pi/2$ phase shift of the coupler 20 is advantageously utilized to provide constructive interference at port 3, and destructive interference at port 4. For purposes of discussion, the coupler 20 may be viewed as having a point of effective coupling at the center of the coupler 20, with the ports 1, 2, 3, and 4 equidistant from this point and spaced therefrom by an integral number of wavelengths. The loop length (L) may be viewed as the distance from the coupling point, around the loop 14, and back to the coupling point, which, for resonance, should be $(q-\frac{1}{4})$ wavelengths, where q is an integer.

In regard to FIG. 4, the input signal wave $W_i$ will be assumed to be a reference wave having zero phase, and that the phases of all of other waves (i.e., $W_c$ and $W_o$) are defined relative to the input wave $W_i$. Further, any wave propagating through the coupler 20 will be divided into two components, namely, a "cross-coupled" component will be designated by the subscript "c", and a "straight through" component, which will be designated by the subscript "s". Thus, the input wave $W_i$ will be divided into a cross-coupled component $W_{ic}$, which propagates from port 1 to port 4, and a straight through component $W_{is}$ which propagates from port 1 to port 3. Similarly, the wave $W_c$ will be divided into a cross-coupled component $W_{cc}$, which propagates from port 2 to port 3, and a straight through component $W_{cs}$, which propagates from port 2 to port 4.

Assuming the source 22 is turned on at t=0, the input wave $W_i$ will enter port 1 of the coupler 20, with zero phase, for propagation therethrough. The cross-coupled component $W_{ic}$ will undergo a $+\pi/2$ phase shift during propagation to the port 4, while the straight through component $W_{is}$ will remain unchaged in phase during propagation to port 3. Thus, the light wave $W_c$ at port 3 will have a phase of zero. This wave $W_c$ then propagates about the loop 14 towards port 2. Assuming that the loop length L is chosen in accordance with Equation 6, the wave $W_c$, upon raching port 2, will have a phase of $-\pi/2$. During propagation of the wave $W_c$ through the coupler 20, the cross-coupled component $W_{cc}$ undergoes a $+\pi/2$ phase shift, so that, upon reaching port 3, its phase is zero, the same as that of the input wave component $W_{is}$. Thus, the circulating wave component $W_{cc}$ will constructively interfere with the input wave component $W_{is}$ at port 3, thereby increasing the intensity of the circulating wave $W_c$ at port 3. The straight through component $W_{cs}$ of the circulating wave $W_c$, on the other hand, does not change in phase as it propagates from port 2 to port 4, so that, at port 4, its phase will still be $-\pi/2$. Thus, this component $W_{cs}$ will destructively interfere with the cross-coupled input light component $W_{ic}$, which has a phase of $+\pi/2$.

Figure 5:
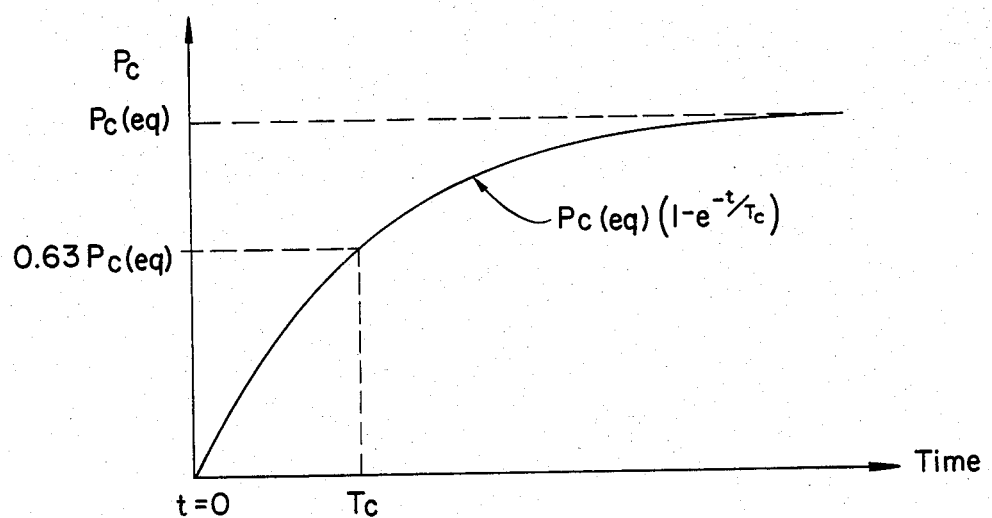
FIG. 5 is a graph of circulating power as a function of time, showing the circulating power asymtotically building up to an equilibrium value over a time period equal to the cavity rise time.

Consequently, as the wave $W_c$ circulates through the loop 14, it will constructively interfere with the input signal wave $W_i$ at port 3, and destructively interfere therewith at port 4, thereby gradually (and asymtotically) building up the power (intensity) $P_c$ of light circulating in the loop 14 until an equilibrium value $P_{c(eq)}$ is reached, as shown in FIG. 5. The time required for such light to build up to 63% (i.e., $1-e^{-1}$) of the equilibrium value is defined as the cavity rise time ($T_c$), also commonly referred to as the cavity decay time.

In order to achieve full resonance at the equilibrium value, and thus, zero output power at port 4, a second condition must be satisfied, namely, the straight through circulating wave component $W_{cs}$ at port 4 must have an amplitude equal to the amplitude of cross-coupled input signal component $W_{ic}$ at port 4. For this to occur, the coupling constant K is adjusted to a value $K_r$, which will be referred to hereinafter as the "resonant coupling constant". By solving Equations 2, 3, and 4 for $E_4/E_1$, and setting $E_4/E_1$ equal to zero (which is the condition for resonance), the resonant coupling constant $K_r$ may be found to be:

$$K_r = (1-\gamma_0)\exp(-2\alpha_0 L) \qquad (7)$$

In the embodiment shown, the coupler transmission is $1-\gamma_0$ and the fiber transmission is $\exp(-2\alpha_0 L)$. Thus, $$K_r = \text{coupler transmission} \times \text{fiber transmission} \qquad (8)$$

For the embodiment disclosed, the fiber attenuation is 8.3 dB/km, the loop 14 is 10 meters, so $2\alpha_0 L$ equals 0.0158 at a wavelength of 632.8 nm. With a coupler insertion loss of 1.8%, this yields a resonant coupling constant of 0.967.

Using the resonant coupling constant defined by Equation 7, Equations 2, 3, and 4 yield the following circulating power (intensity) and output power (intensity), normalized with respect to input power:

$$\left|\frac{E_3}{E_1}\right|^2 = \frac{P_{c(3)}}{P_i} = \frac{(1-\gamma_0)(1-K_r)}{(1+K_r)^2 - 4K_r\sin^2(\beta L/2 - \pi/4)} \qquad (9)$$

$$\left|\frac{E_4}{E_1}\right|^2 = \frac{P_o}{P_i} = \qquad (10)$$

-continued $$(1-\gamma_o)\left[1 - \frac{(1-K_r)^2}{(1+K_r)^2 - 4K_r\sin^2(\beta L/2 - \pi/4)}\right]$$

where $P_{c(3)}$ is the power (intensity) of the circulating wave $W_c$ at port 3; $P_i$ is the power (intensity) of the input signal wave $W_i$; and $P_o$ is the power (intensity) of the output wave $W_o$ at port 4.

If $\beta L$ is chosen to satisfy the resonant condition defined by Equation 6, Equation 9 reduces to:

$$\left|\frac{P_c}{P_i}\right|_{max} = \frac{1-\gamma_o}{1-K_r} \quad (11)$$

This equation may be rewritten as:

$$P_i = P_c(1-K_r) + P_i\gamma_o \quad (12)$$

If Equation 6 is satisfied, $1-K_r$ is equal to the round-trip fractional intensity loss for the circulating wave $W_c$, (i.e., coupler insertion loss plus fiber transmission loss). Thus, the right-hand side of Equation 12 represents the total power dissipated in the coupler 20 and loop 14. Accordingly, it may be seen from Equation 12 that, at full resonance, the circulating power $P_c$ is such that the total power dissipated in the loop and coupler equals the input power $P_i$ at port 1.

Figure 6:
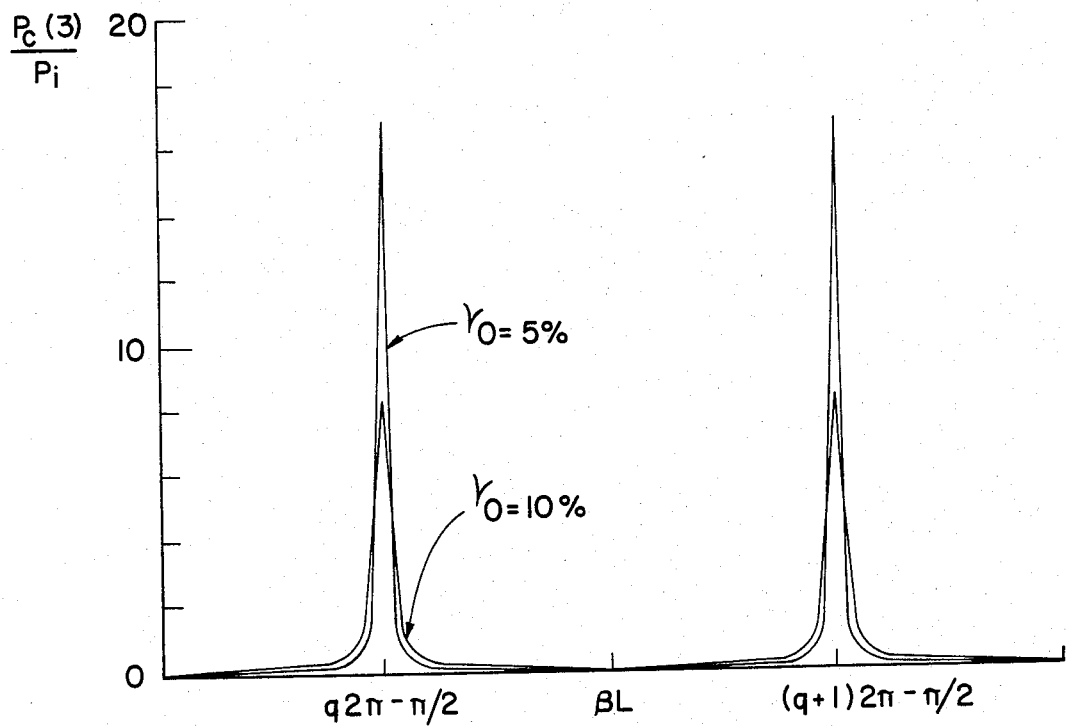
FIG. 6 is a graph of the circulating power at port 3, normalized with respect to the input power, as a function of the phase delay through the fiber loop, showing the normalized circulating power at resonance for exemplary coupler insertion losses of 5% and 10%.
Figure 7:
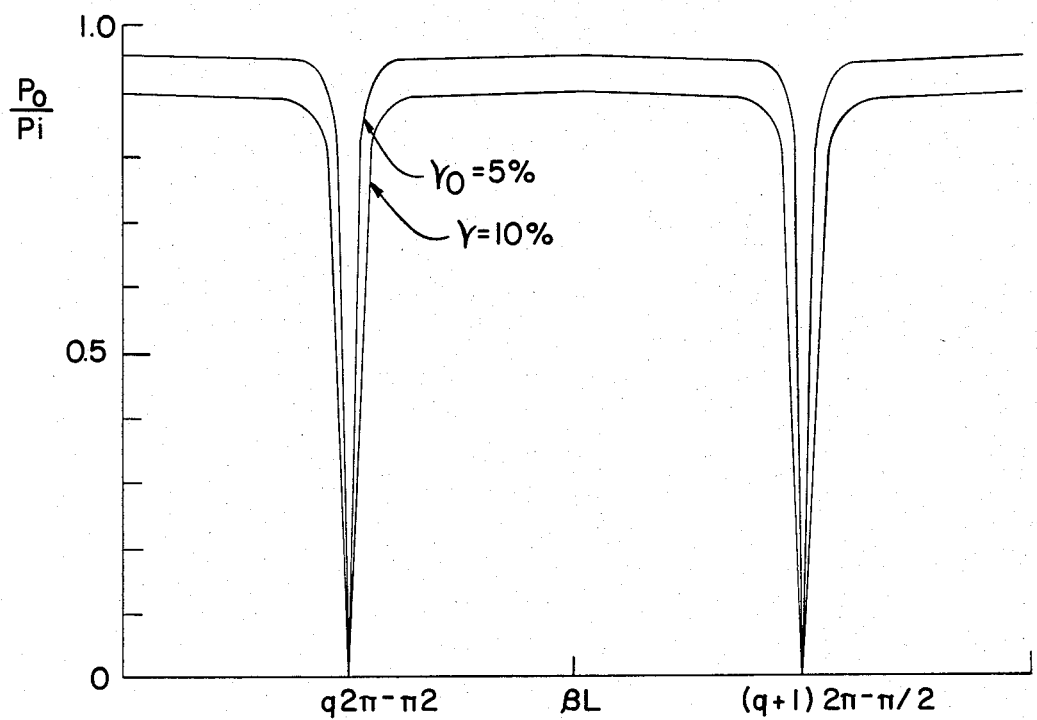
FIG. 7 is a graph of output power, normalized with respect to input power, as a function of the phase delay through the fiber loop, showing zero output power at resonance for both exemplary coupler insertion losses of 5% and 10%.

The theoretical normalized circulating power and output power, defined by Equations 9 and 10, respectively, are shown as a function of $\beta L$ for two exemplary coupler insertion loss values, namely, 5% and 10%, in FIGS. 6 and 7, respectively. Although these curves are for a loop length of 3 meters (2 $\alpha_0 L = 0.0057$), it will be understood that similar curves may be developed for a 10-meter loop length. As shown in FIG. 6, circulating power $P_c$ is highly dependent upon coupler insertion losses, being about 9 times the input power $P_i$ for an insertion loss of 10%, and almost 19 times input power $P_i$ for an insertion loss of 5%. The output power $P_o$, in contrast, drops to zero at full resonance in either case, as shown in FIG. 7. However, it will be seen that the minima and maxima of FIGS. 6 and 7 become sharper as insertion loss decreases, indicating that cavity finesse is highly dependent upon coupler insertion loss.

The cavity finesse (F) may be defined as:

$$F = FSR/\delta f \quad (13)$$

Where FSR is the free spectral range of the resonant cavity (i.e., the distance between the minima (FIG. 7) or the maxima (FIG. 6)); and $\delta f$ is the width of the circulating power maxima (FIG. 6) at one-half of the maximum circulating power (i.e., at one-half power at full resonance). The free spectral range (FSR) may be defined as:

$$FSR = c/nL \quad (14)$$

By setting Equation 9 equal to one-half $|P_{c(3)}/P_i|_{max}$, the full width at half maximum may be found:

$$\delta f = \frac{c}{nL}\left\{1 - \frac{2}{\pi}\sin^{-1}\left[1 - \frac{(1-K_r)^2}{4K_r}\right]^{\frac{1}{2}}\right\} \quad (15)$$

For $K_r$ near unity, $\delta$ may be approximated as:

$$\delta f = \frac{c}{nL} \cdot \frac{1-K_r}{\pi\sqrt{K_r}} \quad (16)$$

This approximation is within 0.2% for $K_r$ greater than 0.8.

Substituting Equation 14 and 16 into Equation 13, the cavity finesse is therefore:

$$F = \frac{\pi\sqrt{K_r}}{1-K_r} \quad (17)$$

It will be recalled from Equation 8 that the resonant coupling constant $(K_r)$ is equal to the product of coupler transmission and fiber transmission, so that the quantity $1-K_r$ is equal to the total fractional losses around the loop 14. It may be seen from Equation 17 that, as these fractional losses decrease, the finesse increases. Thus, the finesse is highly dependent upon losses, and may be increased by decreasing either the coupler insertion losses or the fiber transmission losses, or both. For the embodiment shown, the finesse is about 80 and the free spectral range for the 10-meter loop 14 is about 20.6 MHz.

Finally, referring back to FIG. 5, the cavity rise time $T_c$ may be approximated as follows:

$$T_c = nL/c/2(1-K)_r \quad (18)$$

For resonant effects, the laser source 22 should have a coherence length greater than $cT_c$.

Figure 8:
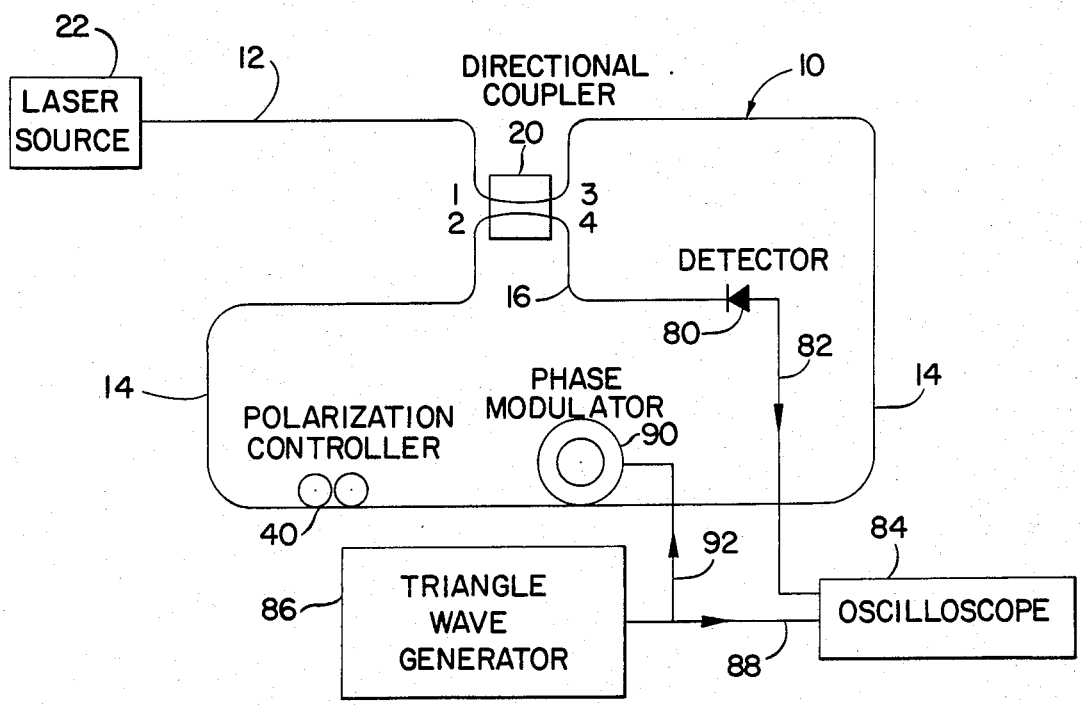
FIG. 8 is a schematic drawing of one embodiment of the resonator of FIG. 1.

Referring to FIG. 8, the resonant effects predicted by Equations 9 and 10 may be observed by providing a detector 80 for measuring the optical power (intensity) of the output wave $W_o$ at the end of the fiber portion 16. The detector 80 outputs an electrical signal, on a line 82, which is proportional to the optical intensity of the output wave $W_o$. This line 82 is connected to input such signal to an oscilloscope 84. A signal from a triangle wave generator 86 is provided to the oscilloscope 84 on a line 88, and to a phase modulator 90 on a line 92. By way of specific example, the phase modulator may comprise a PZT cylinder having a 3-inch diameter, about which a portion of the fiber loop 14 is wrapped 26 times. The signal from the trianglewave generator 86 drives the PZT cylinder 90 to expand radially, and thus, linearly stretch the fiber 14 to periodically vary the fiber length (L) at the generator 86 frequency. In this configuration, the behavior of the fiber resonator is somewhat analogous to that of a scanning Fabry-Perot interferometer.

Figure 9:
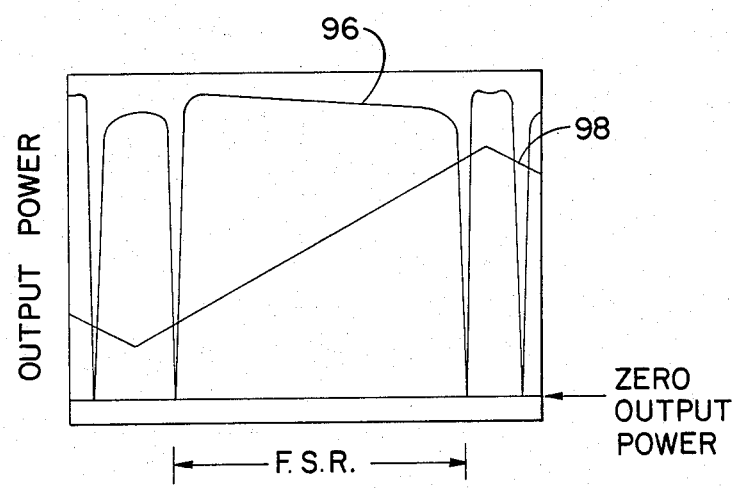
FIG. 9 is a graph illustrating resonant behavior for the embodiment shown in FIG. 8.

FIG. 9 shows the oscilloscope traces of the detector current 96, representing the optical output power ($P_o$), and the triangular wave generator signal 98, representing the amount that the fiber is stretched by the phase modulator 90. The amount of fiber elongation provided by the signal 98 is slightly more than a wavelength, so that the output power shown in FIG. 9 drops to zero twice during each linear stretch of the fiber, thus demonstrating resonant behavior. If the coupling constant is varied slightly from the resonant coupling constant $K_r$, finesse will be reduced, non-zero output power will be observed at the minima of the curve 96.

Figure 10:
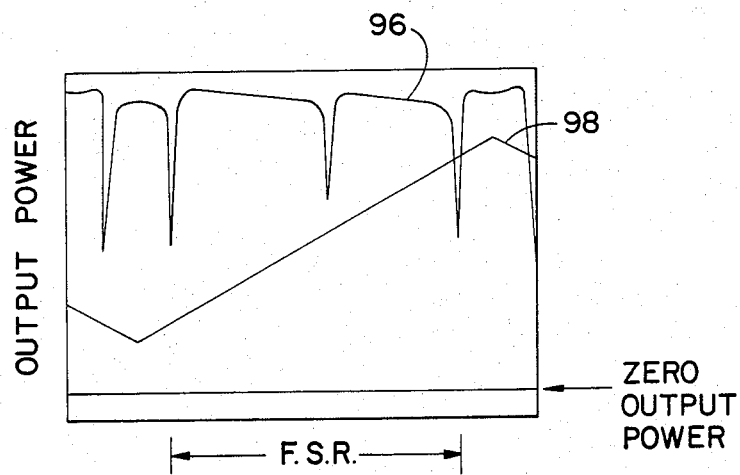
FIG. 10 is a graph, similar to that of FIG. 9, showing the effect, upon resonant behavior, of misaligning the polarization controller so that light propagates in both polarization modes.

The importance of maintaining polarization of light in the fiber loop 14, e.g., by means of the polarization controller 40, it is illustrated in FIG. 10, which shows the results of rotating the quaterwave loops of the polarization controller 40 away from the optimum position. As shown therein, two resonant modes, corresponding to the two independent polarization modes, are observed. The two modes resonate at different scanned positions due to slightly different propagation velocities. Each of the resonant modes has non-zero output power because, when one mode is resonating the other is not, and thus, the output power of a non-resonant mode is observed at resonance of either mode.

OPERATION AS AN ACOUSTIC SENSOR

The above-described resonator provides a highly sensitive acoustic sensor, which detects the frequency and intensity of acoustic waves impinging upon the fiber loop. As the acoustic wave fronts strike the fiber loop 14, the length of the loop is modulated in accordance with the frequency and intensity of the wave fronts. Such modulation of the loop length causes the total roundtrip phase delay through the loop 14 to concomitantly modulate. Assuming the fiber loop cavity is at least partially resonant, such modulation in the roundtrip phase delay will cause the optical power of the output signal $W_0$ to responsively modulate. Thus, by detecting intensity fluctuations in the output wave $W_0$, the intensity and frequency of the audio waves may be determined.

The length of the optical fiber loop is sensitive not only to acoustic waves, but also to other ambient effects, particuarly temperature and vibration. Thermally and vibrationally induced loop changes, however, tend to be at a low frequency compared to that of the audio band. Accordingly, the sensor of the present invention detects low frequency components of the modulated output power and passes these components through a feedback loop to mechanically vary the length of the fiber loop 14 to compensate for thermally and vibrationally induced variations in loop length, and prevent such variations from affecting the detection of the audio frequency signals.

Figure 11:
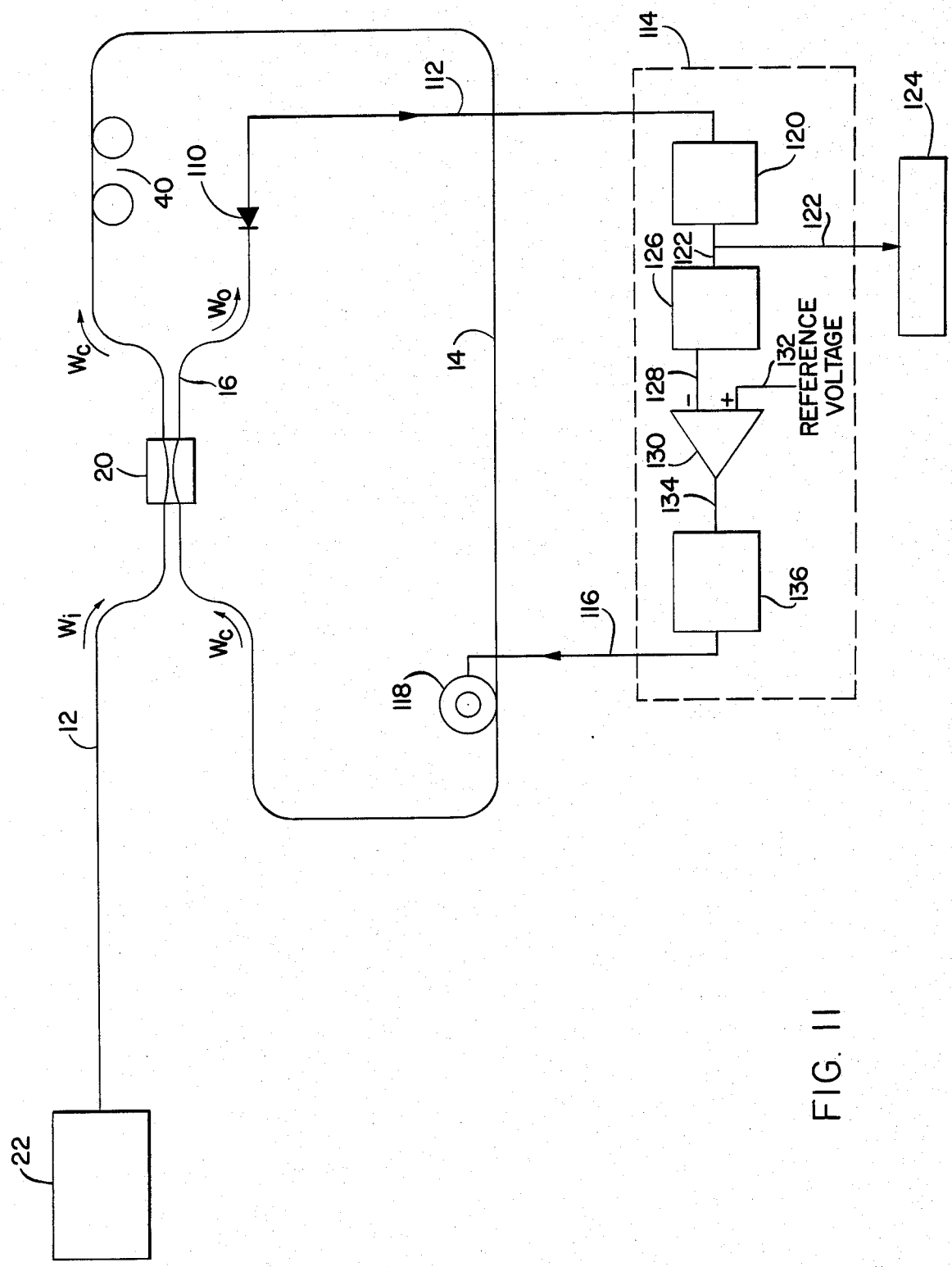
FIG. 11 is a schematic drawing of the acoustic sensor of the present invention, utilizing the resonator of FIG. 1, showing an electronic stabilization feedback circuit for driving a PZT cylinder in the fiber loop to stabilize the optical output power against low frequency thermal drift.

As shown in FIG. 11, the sensor of the present invention includes a detector 110 for detecting the optical power of the output wave $W_0$ at the end of the fiber portion 16. The detector 110 outputs an electrical signal, on a line 112, which is proportional to the optical intensity of the output wave $W_0$. This line 112 is connected to input such signal to stabilization electronics 114. In response to this signal, the stabilization electronics 114 outputs, on a line 116, a signal for driving a PZT cylinder 118 in the fiber loop 114. The signal from the stabilization electronics 114 drives the PZT cylinder 118 to expand radially, and thus, linearly stretch the fiber 14 to vary the fiber loop 14 length. By way of specific example, the PZT cylinder may have a 3-inch diameter, about which a portion of the fiber loop 14 is wrapped 26 times.

In effect, the stabilization electronics 114 provides a bandpass filter which passes low frequency components of the detector current, and drives the PZT cylinder 118 to stretch the fiber loop by an amount proportional to such components. This stabilizes the total collected roundtrip phase delay around the loop 14 against low frequency drift caused, e.g., by temperature fluctuations.

The stabilization electronics 114 includes a transimpedance amplifier (operational amplifier) 120, for converting current on the line 112 to a voltage. Such voltage is output on a line 122 to a signal processor 124, which may comprise a display or recording unit, such as a sound recorder, loud speaker, or chart recorder, for displaying a representation or a "print" of the sensed acoustic waves. The line 122 is also connected to provide this signal to a low-pass filter 126 which blocks frequencies greater than about 10 KHz. The sole purpose of this filter 126 is to prevent the PZT cylinder from resonating, since, in the embodiment shown, it has a resonant frequency of about 25 KHz. The output from the low-pass filter 126 is provided on a line 128 to a differential amplifier 130, which compares the voltage on the line 128 with a reference voltage which is input to the amplifier 130 on a line 132, to provide an error signal. The differential amplifier 130 outputs this error signal on a line 134 to an integrator 136, which outputs a signal on the line 116 to drive the PZT cylinder 118. Through adjustment of the reference voltage, the PZT cylinder 118 is biased to operate such that the loop 14 may be lengthened or shortened through a range which provides a phase delay of, e.g., up to $+/-20$ radians. The integrator 136 is an active low-pass filter which provides a preferential response, in terms of gain, for low frequencies. The gain is negligible for the acoustic frequency band, and increases linearly as the frequency of the error signal decreases. Thus, the stabilization electronics 114 drives the PZT cylinder 118 in response to low frequency drift components of the detector current to provide compensation for loop length changes caused by ambient environmental effects, such as temperature and vibration.

The operation of the acoustic sensor may be more fully understood by analyzing the behavior of the optical output wave $W_0$, as it varies in response to changes in loop length. In this regard, it is helpful to rewrite Equation 10 in terms of the total phase delay around the fiber loop 14, which phase delay will be referred to as $\phi$. Accordingly:

$$P_0(\phi) = P_{max} f(\phi) \qquad (19)$$

where:

$$P_{max} = \eta(1 - \gamma_0) \qquad (20)$$

$$f(\phi) = \frac{1 - \sin^2(\phi/2)}{1 - \eta \sin^2(\phi/2)} \qquad (21)$$

$$\eta = \frac{4 K_r}{(1 + K_r)^2} \qquad (22)$$

It will be understood that the term $P_0$, as used hereinafter, refers to the intensity of the output wave $W_0$, normalized with respect to the intensity of the input wave $W_i$ (i.e., normalized between zero and 1.0). Further, the symbol $P_{max}$ will be used to refer to the maximum output power (intensity) of the output wave $W_0$ (i.e., the optical power at port 4 when the loop is non-resonant).

Figure 12:
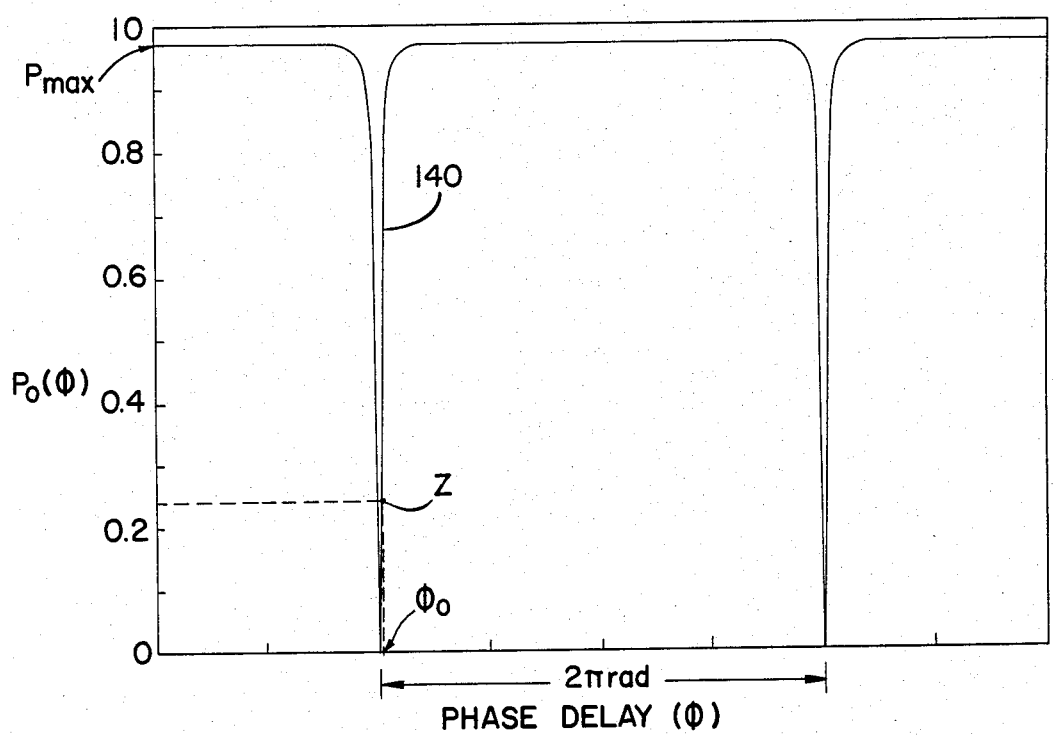
FIG. 12 is a graph of optical output power at port 4, as a function of the total round trip phase delay of light circulating through the fiber loop, showing the point of maximum slope at which the sensor is stabilized to operate.

As shown in FIG. 12, $P_0(\phi)$ varies between $P_{max}$ and zero with a periodicity of $2\pi$. Note that $f(\phi)$ varies between one and zero with the same periodicity. The maximum slope of $P_0(\phi)$ is:

$$\left|\frac{dP_o}{d\phi}\right|_{max} = P_{max} \frac{\frac{1}{2}(\eta - 1) \sin \phi_o}{1 - \eta \sin^2 (\phi_o/2)} \quad (23)$$

where $\phi_0$ is the total phase delay corresponding to the point of maximum slope of $P_0(\phi)$, which is equal to:

$$\phi_o = \cos^{-1}\{1/\eta - \tfrac{1}{2} - \tfrac{1}{2}\sqrt{9 - 4/\eta + 4/\eta^2}\ \} \quad (24)$$

Referring now to FIG. 12, together with FIG. 11, the reference voltage on the line 132 is preferably adjusted to drive the PZT cylinder 118 to provide a loop length which yields a phase delay corresponding to $\phi_0$, so that the resonator operates at a point Z of maximum slope on the output power curve 140. The total phase delay $\phi$, around the loop 14, at this point Z, is equal to an integral number of wavelengths plus, or minus, $\phi_0$. This operating point Z, which, for the embodiment shown, corresponds to a normalized output power $P_0(\phi)$ of about 0.24, is stabilized with respect to low frequency drift by the above-described stabilization electronics 114.

Figure 13:
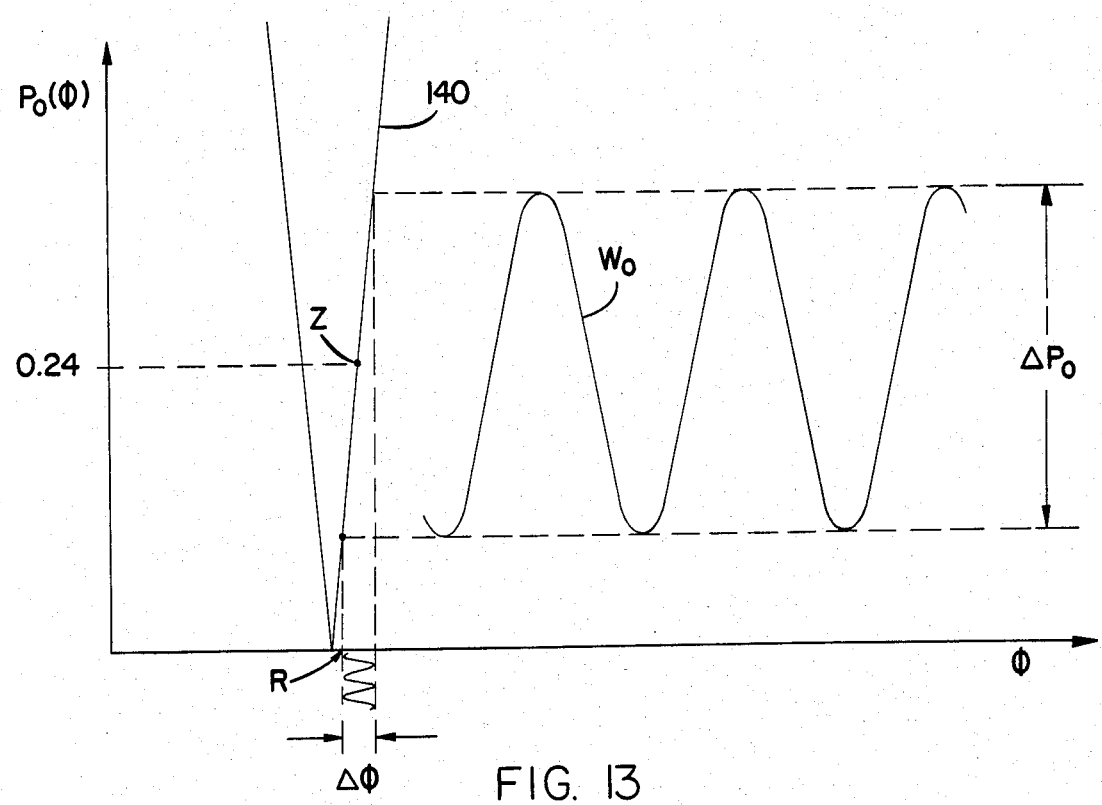
FIG. 13 shows a portion of the graph of FIG. 12, illustrating the effect upon optical output power of phase modulation caused by acoustic wave induced loop length changes.

Because of the steep slope of the output power curve 140, a small excursion in phase away from the operating point Z will produce a substantial change in output power. Further, since the output power curve 140 is nearly linear about the operating point Z, there is proportionality between small phase shifts and resulting changes in output power. For example, a very small sinusoidal phase shift, induced by loop length changes caused by acoustic waves, will produce a detectable sinusoidal modulation in output power about the operating point Z. For example, as shown in FIG. 13, if the sensed acoustic wave modulates the length of the loop 14 such that the collected phase delay around the loop 14 is modulated by $\Delta\phi$, the output wave $W_0$ will be correspondingly modulated by an amount $\Delta P_0$. Although only single frequency, constant amplitude sinusoidal modulation is shown in FIG. 13, it will be understood that, whatever the intensity and frequency of the acoustic wave, the output wave $W_0$ will vary accordingly. Further, while, for the purposes of illustration, the curve 140 is shown as being fixed, with the point Z moving up and down the curve 140, it will be recognized that, in actuality, the entire curve 140 is shifting along the X axis, about the point R, with point Z fixed. Such shift of the curve 140 is caused by acoustic wave induced changes in the loop length, which causes the resonant frequency of the loop 14 to change.

In general, the sensitivity of the sensor is proportional to the slope of the output power curve. For the embodiment shown, the maximum slope is about 14 radians$^{-1}$, a considerable improvement over comparable Mach-Zehnder interferometers with a maximum slope of $\tfrac{1}{2}$ radian$^{-1}$.

The minimum detectable phase shift (i.e., the phase shift for a signal to noise ratio of 1) may be defined as follows:

$$\Delta\phi|_{min} = \Delta T_{noise} \left\{ \left|\frac{dP}{d\phi}\right|_{max} \right\}^{-1}$$

where $\Delta T_{noise}$ is the transmission noise (including detection) resulting from the limiting noise of the system. For this equation, both $P_{max}$ and $\Delta T_{noise}$ are measured in units of photodetector current and not as normalized transmission from zero to one. For the values of $|dP/d\phi|_{max}$ provided above, a factor of about 30 improvement in the minimum detectable phase shift may theoretically be expected for the sensor of the present invention, compared to that of a comparable Mach-Zehnder interferometer, assuming the same limiting noise value ($\Delta T_{noise}$).

Tests indicate that a primary source of noise, in the sensor of the present invention, is not laser amplitude noise, or detector shot and thermal noise, but rather, frequency noise from the laser source 22. For example, to the extent that the laser 22 is not exactly monochromatic, and varies from the frequency at the operating point Z, the laser may produce frequency noise having an envelope in the audio frequency band. This frequency noise, therefore, may be detected and misinterpreted as an acoustic wave induced change in the fiber loop length. For a given loop length and free spectral range, this frequency noise, when detected in the optical output wave $W_0$, has a magnitude proportional to the slope (dP/d$\phi$) of the output power curve 140. Therefore, the signal to noise ratio for this particular type of noise is independent of the slope of the curve 140 for a given loop length. It is believed that such noise can be reduced by improving the monochromacity of the laser source 22.

Although the signal to noise ratio caused by laser frequency noise is not dependent on dP/d$\phi$, this noise ratio may be decreased be increasing the free spectral range of the resonator by shortening the loop length. Such increase in the free spectral range has little effect on dP/d$\phi$, but a significant effect on dP/df, where f is frequency. For example, assuming a resonator finesse of 80, a change of 0.1$\pi$ in phase corresponds to a frequency change of about 1 MHz for a free spectral range of about 20 MHz, but corresponds to a 0.2 MHz frequency change for a free spectral range of 4 HMz. Thus, in a loop having a 20 MHz free spectral range, the resonator will be less sensitive to laser frequency noise than with a loop having a 4 MHz free spectral range, assuming the laser frequency noise is the same in both cases. Consequently, for applications where a long loop length is important, a highly monocromatic source, with an associated long coherence length, is desirable. However, the loop length should be kept as short as possible to reduce noise problems. In practice, the loop length is chosen so that there is a sufficient amount of optical fiber exposed to the sensed quantity to insure that the optical output signal is measurable, within the desired dynamic range. For the embodiment shown, the maximum dynamic range would be zero to 0.48 (normalized power—FIG. 13) since the operating point Z is at 0.24 (normalized power) on the curve 140.

Figure 14:
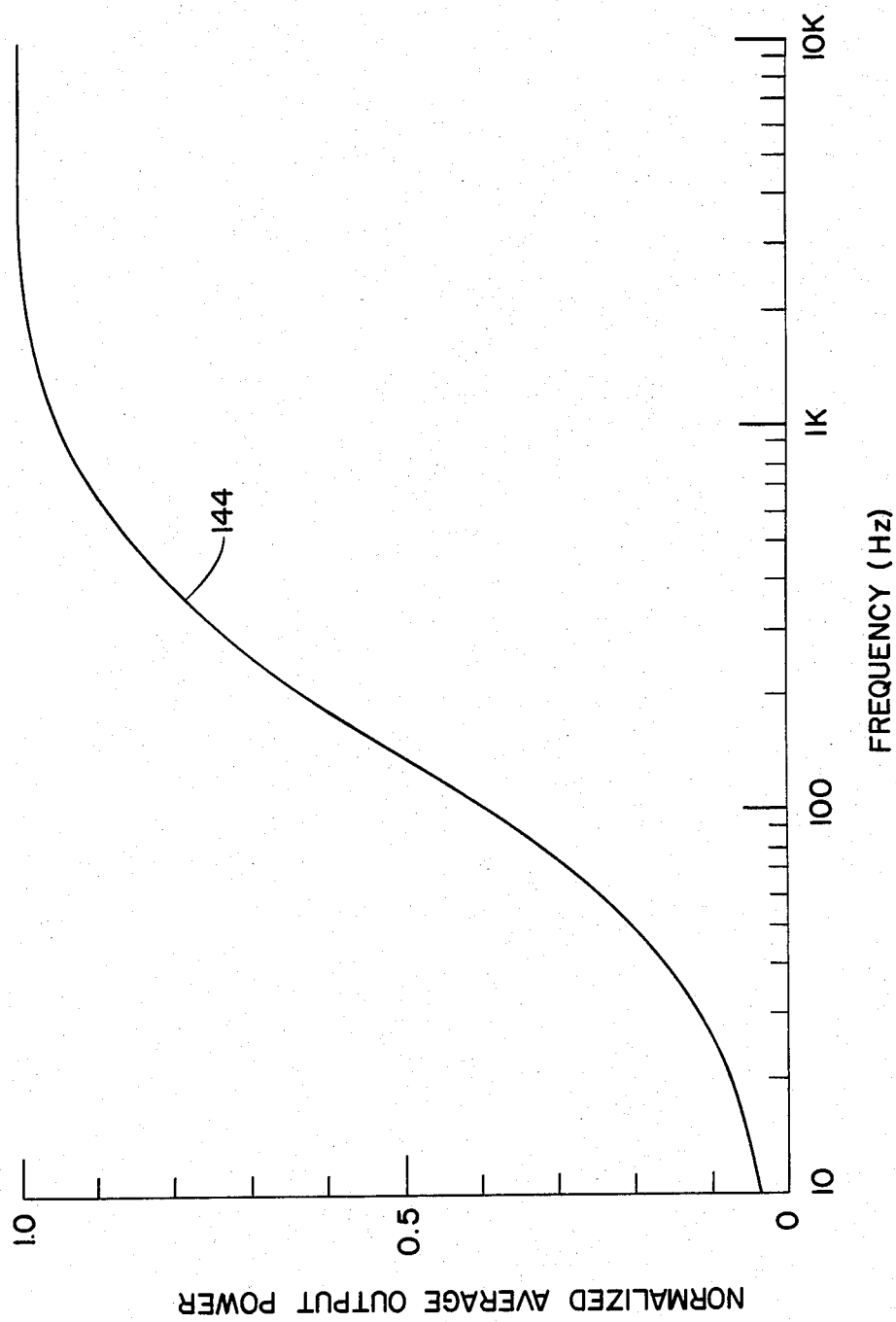
FIG. 14 is a plot of the average optical output signal power (normalized between zero and 1.0) as a function of the frequency of the sensed acoustic wave, showing the response of the sensor of the present invention.

The graph of FIG. 14 shows the overall response of the stabilized interferometric sensor as a function of frequency. The average output power measured by the detector 110, normalized between zero and one, is plotted on the Y axis, while the sensed acoustic wave frequency is plotted on the X axis, yielding a response curve 144. Below 100 Hz, the output power is attenuated substantially, since, in this frequency range, loop changes caused by the sensed acoustic wave are indistinguishable from thermal drifts. However, no attenuation occurs above 1 KHz. Thus, the sensor of the present invention provides a flat response for frequencies above 1 KHz. It will be recognized, however, that in an environment where temperature drift is not a factor, such curve 144 will not be attenuated by the stabilization system, and thus, very low frequency acoustic waves may be sensed.

What is claimed is:

1. A fiber optic sensor, comprising:
    a single uninterrupted strand of optical fiber having first and second end portions and a loop portion therebetween;
    fiber optic coupling means for optically closing said fiber loop;
    means for applying a lightwave to said first end portion for propagation through said fiber to said second end portion to provide an optical output signal, the intensity of said optical output signal dependent upon the length of said loop;
    means for controlling the roundtrip phase delay of light circulating through said fiber loop to provide a resonant cavity for said circulating light;
    said fiber loop length sensitive to first and second ambient effects, said first ambient effect varying in a first frequency range, said second ambient effect varying in a second frequency range;
    means for compensating for fiber loop length changes caused by said first ambient effect to stabilize said output signal against said first ambient effect, said output signal remaining sensitive to said second ambient effect; and
    means for detecting intensity variations in said output signal to detect said second ambient effect.

2. A fiber optic sensor, as defined in claim 1, wherein said phase delay controlling means provide a total roundtrip phase delay for said circulating light equal to an integral number of wavelengths $\pm \phi_0$, where:

$$\phi_o = \cos^{-1}\{1/\eta - \tfrac{1}{2} - \tfrac{1}{2}\sqrt{9 - 4/\eta + 4/\eta^2}\}$$

and $$\eta = \frac{4K_r}{(1 + K_r)^2}$$

and where $K_r$ is the resonant coupling constant.

3. A fiber optic sensor, as defined in claim 2, wherein said phase delay controlling means provides a total roundtrip phase delay for said circulating light such that the sensitivity of said output signal to changes in loop length is at a maximum.

4. A fiber optic sensor, as defined in claim 1, wherein said first ambient effect is thermal.

5. A fiber optic sensor, as defined in claim 1, wherein said second ambient effect comprises an acoustic wave.

6. A fiber optic sensor, as defined in claim 1, wherein said compensating means comprises:
    a PZT cylinder, about which a portion of said fiber loop is wrapped.

7. A fiber optic sensor, as defined in claim 6, wherein said compensating means additionally comprises:
    means for driving said PZT cylinder with a signal from said detecting means, said driving means filtering said signal to pass frequency components in said first frequency range, while effectively blocking frequency components in said second frequency range.

8. A fiber optic sensor, as defined in claim 7, wherein said driving means comprises an integrator which provides a preferential gain for signal components in said first frequency range.

9. A fiber optic sensor, as defined in claim 1, wherein said controlling means comprises a PZT cylinder about which a portion of said fiber loop is wrapped.

10. A fiber optic sensor, as defined in claim 1, wherein said coupling means comprises a fiber optic directional coupler.

11. A method of sensing acoustic waves utilizing an optical fiber, said method comprising:
    forming a loop in said fiber;
    applying input light for propagation through said loop to provide an optical output signal;
    using a fiber optic coupler to optically close said loop;
    selecting the length of said loop to provide a resonant cavity, said loop length affecting the intensity of said output signal;
    compensating for thermally induced loop length changes to stabilize said output signal intensity against said thermally induced changes; and
    detecting said output signal to sense the presence of said acoustic waves.

12. A method of sensing acoustic waves utilizing an optical fiber, as defined in claim 11, wherein said selecting step comprises:
    determining the point of maximum sensitivity of said output signal intensity to loop length changes; and
    selecting said loop length to provide an output signal intensity at said point of maximum sensitivity.

13. A method of sensing acoustic waves utilizing an optical fiber, as defined in claim 11, wherein said compensating step comprises:
    detecting components of said output signal having a frequency below that of said sensed acoustic waves; and
    varying the length of said loop in response to said detected frequency components.

14. A method of sensing an ambient effect utilizing an optical fiber, having first and second end portions, said method comprising:
    forming a loop in said fiber, between said first and second end portions;
    optically closing said loop to provide a resonant cavity for light circulating in said loop;
    applying input light to said first end portion, for propagation through said fiber loop to provide an optical output signal at said second end portion, said output signal sensitive to the total roundtrip phase delay of light circulating in said fiber loop;
    controlling the roundtrip phase delay of light circulating through said fiber loop to adjust said optical output signal to a selected value, between a minimum value, corresponding to full resonance of said light circulating in said loop, and a maximum value corresponding to non-resonance of said light circulating in said loop;
    exposing said loop to said ambient effect to cause variations in said roundtrip phase delay; and
    detecting said ambient effect by observing variations from said selected value.

15. A method of sensing an ambient effect utilizing an optical fiber having first and second end portions, as defined in claim 14, wherein said selected value corresponds to a point of maximum sensitivity of said optical output signal to said roundtrip phase delay.

16. A method of sensing an ambient effect utilizing an optical fiber having first and second end portions, as defined in claim 14, wherein said variations in said output signal are substantially proportional to said variations in said phase delay.

17. A method of sensing an ambient effect utilizing an optical fiber having first and second end portions, as defined in claim 14, wherein said ambient effect is an acoustic wave.

18. A fiber optic sensor for sensing an ambient effect, comprising:
- an optical fiber having first and second end portions and a loop portion therebetween;
- means for optically closing said loop to provide a resonant cavity;
- means for applying a lightwave to said first end portion for propagation through said loop to said second end portion to provide an optical output signal;
- means for controlling the total roundtrip phase delay for light in said loop to adjust said output signal to a selected value, between a minimum value, corresponding to full resonance of said lightwave in said loop, and a maximum value, corresponding to non-resonance of said lightwave in said loop; and
- means for detecting variations in said output signal from said selected value to sense said ambient effect.

19. A fiber optic sensor, as defined in claim 18, wherein said output signal is sensitive to said phase delay, and said selected value corresponds to a point of maximum sensitivity of said output signal to said phase delay.

20. A fiber optic sensor, as defined in claim 18, wherein said ambient effect is an acoustic wave.

21. A fiber optic sensor, as defined in claim 18, wherein said optically closing means comprises a fiber optic coupler.

* * * * *